(12) United States Patent
Yang et al.

(10) Patent No.: US 12,491,497 B2
(45) Date of Patent: Dec. 9, 2025

(54) CATALYST FOR PHOTOCATALYTIC REACTION FOR THE PRODUCTION OF HYDROGEN BY HYDROLYSIS AND PREPARATION METHOD THEREOF

(71) Applicant: Shihezi University, Shihezi (CN)

(72) Inventors: Shengchao Yang, Shihezi (CN); Qi Li, Shihezi (CN); Zhiyong Liu, Shihezi (CN); Jianning Wu, Shihezi (CN); Guihua Meng, Shihezi (CN)

(73) Assignee: Shihezi University, Shihezi (CN)

( * ) Notice: Subject to any disclaimer, the term of this patent is extended or adjusted under 35 U.S.C. 154(b) by 191 days.

(21) Appl. No.: 18/168,511

(22) Filed: Feb. 13, 2023

(65) Prior Publication Data
US 2023/0264174 A1    Aug. 24, 2023

(30) Foreign Application Priority Data
Jun. 7, 2022    (CN) .......................... 202210636738.1

(51) Int. Cl.
| | | |
|---|---|---|
| B01J 21/00 | (2006.01) | |
| B01J 21/06 | (2006.01) | |
| B01J 23/06 | (2006.01) | |
| B01J 35/23 | (2024.01) | |
| B01J 35/39 | (2024.01) | |
| B01J 37/00 | (2006.01) | |
| B01J 37/02 | (2006.01) | |

(Continued)

(52) U.S. Cl.
CPC ............. *B01J 21/063* (2013.01); *B01J 23/06* (2013.01); *B01J 35/23* (2024.01); *B01J 35/39* (2024.01); *B01J 37/009* (2013.01); *B01J 37/0236* (2013.01); *B01J 37/035* (2013.01); *B01J 37/04* (2013.01); *B01J 37/06* (2013.01); *B01J 37/342* (2013.01); *C01B 3/042* (2013.01)

(58) Field of Classification Search
None
See application file for complete search history.

(56) References Cited

FOREIGN PATENT DOCUMENTS

| CN | 202111325693.8 | 3/2022 |
| CN | 202210029268.2 | 4/2022 |

OTHER PUBLICATIONS

Chen et al, A double-layered photoanode made of ZnO/TiO2 composite nanoflowers and TiO2 nanorods for high efficiency dye-sensitized solar cells, J Solid State Electrochem, 22, 685-691 (Year: 2018).*

(Continued)

*Primary Examiner* — Stefanie J Cohen

(57) ABSTRACT

The present invention is a catalyst for a photocatalytic reaction for the production of hydrogen by hydrolysis and a preparation method thereof. A preparation method of a catalyst for a photocatalytic reaction for the production of hydrogen by hydrolysis, comprising: after dispersing the ZnO nanorods into a solvent, adding $TiCl_4$ and water, followed by hydrothermal treatment, washing and drying to obtain a $ZnO@TiO_2(B)$ nanoflower catalyst, i.e. the catalyst. According to the present invention, a catalyst for a photocatalytic reaction for the production of hydrogen by hydrolysis and a preparation method thereof, embedding ZnO nanocrystals into a $TiO_2(B)$ lattice can improve the stability of photocatalytic hydrogen production.

9 Claims, 3 Drawing Sheets

(51) Int. Cl.
*B01J 37/03* (2006.01)
*B01J 37/04* (2006.01)
*B01J 37/06* (2006.01)
*B01J 37/34* (2006.01)
*C01B 3/04* (2006.01)

(56) References Cited

OTHER PUBLICATIONS

Harito et al, PbO2 decorated ZnO-TiO2 core-shell nanoflower structures by zinc anodising for photo- and anodic degradation of Reactive Black-5 dye, Vietnam Academy of Science and Technology, Adv. Nat. Sci: Nanosci. Nanotechnol. 11 (Year: 2020).*

* cited by examiner

CATALYST FOR PHOTOCATALYTIC REACTION FOR THE PRODUCTION OF HYDROGEN BY HYDROLYSIS AND PREPARATION METHOD THEREOF

CROSS REFERENCE TO RELATED APPLICATION

This application claims priority to Chinese Patent Application No. CN202210636738.1, titled "CATALYST FOR PHOTOCATALYTIC REACTION FOR THE PRODUCTION OF HYDROGEN BY HYDROLYSIS AND PREPARATION METHOD THEREOF" and filed to the State Patent Intellectual Property Office on the entire contents of which are incorporated herein by reference.

FIELD OF THE INVENTION

The present invention is in the technical field of nanocomposite photocatalyst materials, and particularly relates to a catalyst for a photocatalytic reaction for the production of hydrogen by hydrolysis and a preparation method thereof.

BACKGROUND

The demand for energy in contemporary society aggravates the depletion of fossil energy and the deterioration of living environment, restricting the further development of economic society. In the field of natural science, people urgently need to develop new clean energy to solve these two problems, and have achieved certain results. For example, wind power, water power and solar power in nature are used to replace traditional power generation methods such as burning coal and oil. Help the sustainable development of human society, but these measures still have many shortcomings, such as high requirements for geographical location, poor continuity, the generation of energy is not suitable for storage, etc. which limits the comprehensive promotion.

Since the concept of hydrogen energy has been proposed, it has been considered as a clean and efficient energy without any pollution to the environment, without burdening the global carbon cycle, and it is known as a real "green energy". Many automobile fuels now use hydrogen to replace the oil currently called "industrial blood" for the purpose of reducing carbon emissions. Many countries in the world also pay more and more attention to the development of hydrogen energy. With the rapid economic development in recent years, China has paid more and more attention to the study of hydrogen energy and tried to find a clean and efficient hydrogen production model.

Since the discovery of photoelectrochemical (PEC) water splitting on $TiO_2$ electrodes by Honda and Fujishima in 1972, semiconductor materials have received much attention for their special optical and electrical properties in artificial light-driven water dissociation. Up to now, researchers are actively developing new catalysts to improve catalytic efficiency, but the high cost and low efficiency of the catalysts still limit their further commercial development and mass production. Among them, titanium dioxide is considered to be an attractive photocatalyst due to its good property, high stability and abundant soil storage. Titanium dioxide has mainly three common presence forms of phase: anatase (tetragonal phase), rutile (tetragonal phase) and brookite (orthogonal phase). Compared with other forms, the original layered $TiO_2(B)$ with lower bulk density and more vacancies has attracted the attention of scholars.

So far, $TiO_2(B)$ has been more used in rechargeable lithium ion batteries, sensors, solar power generation and other fields. The photocatalytic performance of $TiO_2(B)$ is not ideal due to its low photogenerated electron density, low ion diffusion efficiency and poor electrical conductivity. Recent research has now developed various strategies to improve the photocatalytic performance of pure $TiO_2(B)$. For example, many research efforts have attempted to combine $TiO_2(B)$ with other semiconductors. However, the bound form is usually a continuous packing of the two species, forming a composite nanostructure. This configuration is disadvantageous under recycling conditions. The instability of the structure leads to collapse and agglomeration of the structure, and even lattice mismatch occurs in the heterojunction, which makes the performance of the structure fail.

In view of the above, the present invention proposes a new efficient photocatalyst for the production of hydrogen by hydrolysis and a preparation method thereof, which is a lattice-embedded ZnO@$TiO_2(B)$ nanoflower structure and can improve the stability of photocatalytic hydrogen production.

SUMMARY

The present invention aims to provide preparation method of a catalyst for a photocatalytic reaction for the production of hydrogen by hydrolysis that simply embeds fragmented ZnO nanocrystals into a $TiO_2(B)$ lattice to produce new lattice-embedded ZnO@$TiO_2(B)$ nanoflowers.

In order to achieve the above-mentioned object, the technical solution adopted is:

A preparation method of a catalyst for a photocatalytic reaction for the production of hydrogen by hydrolysis, comprising: after dispersing the ZnO nanorods into a solvent, adding $TiCl_4$ and water, followed by hydrothermal treatment, washing and drying to obtain a ZnO@$TiO_2(B)$ nanoflower catalyst, i.e. the catalyst.

Further, the solvent is ethylene glycol;
deionized water and absolute ethanol are used in the washing process for washing.

Further, the temperature of the hydrothermal treatment is 140-160° C., and the time is 3.5-4.5 h;
the drying temperature is 55-65° C., and the drying time is 20-24 h.

Further, the temperature of the hydrothermal treatment is 150° C., and the time is 4 h;
the drying temperature is 60° C., and the drying time is 24 h.

Further, the molar ratio of Zn and Ti in the catalyst is 1:1-6.

Further, the ZnO nanorods were synthesized by electrodeposition method.

Still further, the synthesis process of the ZnO nanorods is: subjecting an aqueous solution containing zinc nitrate and urotropine to electrodeposition treatment in a quartz electrolytic cell at 90° C., followed by centrifugation, washing, and drying to obtain the ZnO nanorods.

Still further, the molar concentrations of zinc nitrate and urotropine are 0.04-0.06 mol/L and 0.04-0.06 mol/L respectively;
in the electrodeposition process, a CFs, a platinum plate and a saturated calomel electrode (SCE) are used as a working electrode, a counter electrode and a reference electrode, respectively; the voltage on the working electrode is −1.1 v, and the reaction time is 2 h;
the drying was performed at 60° C. under vacuum.

Still further, the molar concentrations of zinc nitrate and urotropine are 0.05 mol/L and 0.05 mol/L respectively;

prior to the electrodeposition process, sonicating the CFs in acetone, deionized water, and ethanol, respectively.

The present invention also aims to provide a catalyst for a photocatalytic reaction for the production of hydrogen by hydrolysis, by the above-mentioned preparation method, which provides more electrons to participate in the photocatalytic redox reaction, and significantly improves the photocatalytic hydrogen production performance and cycle stability.

Compared to the prior art, the advantageous effects of the present invention are:

Technical solution according to the present invention, a simple dissolution process of ZnO nanorods embeds fragmented ZnO nanocrystals into a $TiO_2(B)$ lattice. The advantage of this lattice-embedded ZnO@$TiO_2(B)$ type II heterojunction is that it will provide more electrons to participate in the photocatalytic redox reaction while driving efficient charge separation with the heterogeneous interface in the bulk $TiO_2(B)$ phase, significantly improving the photocatalytic hydrogen production performance and cycle stability.

DETAILED DESCRIPTION OF THE EMBODIMENTS

Figure 1:
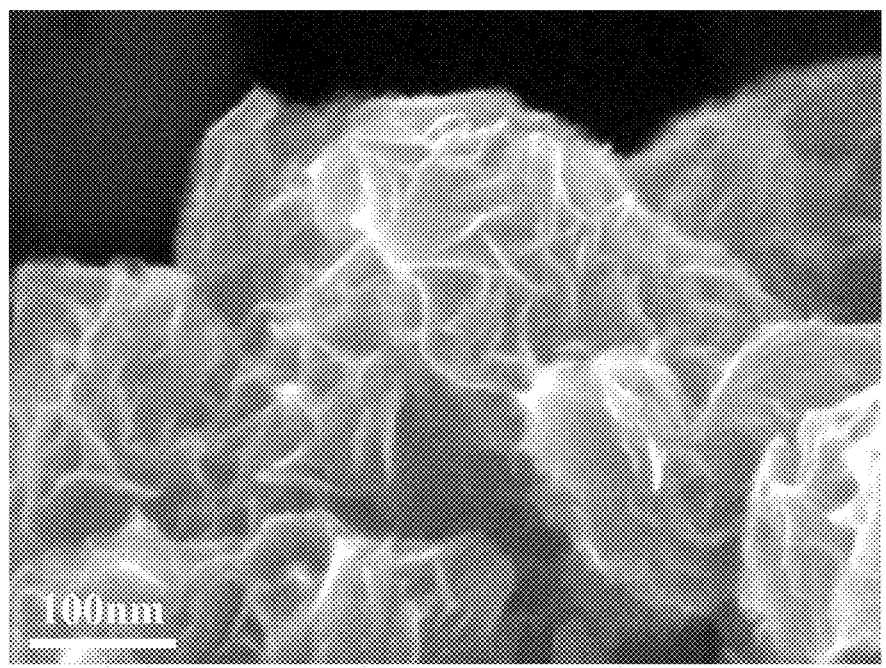
FIG. 1 shows a scanning electron micrograph of the nanoflower of Example 5, the scale of the figure is 100 nm.

In order to further illustrate a catalyst for a hydrolysis-to-hydrogen photocatalytic reaction and a preparation method thereof according to the present invention, and achieve the intended purpose of the present invention, a catalyst for a photocatalytic reaction for the production of hydrogen by hydrolysis and a preparation method thereof according to the present invention, and specific embodiments, structures, features and effects thereof will be described in detail with reference to preferred embodiments. In the following description, various references to "one embodiment" or "an embodiment" are not necessarily to the same embodiment. Furthermore, the particular features, structures, or characteristics of one or more embodiments may be combined in any suitable manner. A catalyst for a photocatalytic reaction for the production of hydrogen by hydrolysis and a method for preparing the same according to the present invention will now be described in further detail with reference to specific examples.

Acid leaching method provides a new method. First, ZnO is an amphoteric oxide, offering the possibility to achieve a bulk phase of the lattice-embedded material. By electrodeposition, the present invention will synthesize high crystallinity ZnO nanorods with broader advantages over commercially available ZnO nanoparticles. The nucleation growth of $TiO_2(B)$ is accompanied by the corrosion of ZnO by taking advantage of the characteristic of $TiCl_4$ hydrolysis that the environment of the hydrolysis process is acidic. By controlling the input of ZnO, incomplete lattice scission of ZnO nanorods can occur during this process. Finally, the lattice of ZnO will be embedded in the lattice of $TiO_2(B)$. The low bulk density unit structure of $TiO_2(B)$ may be key to the synthesis of lattice-embedded ZnO@$TiO_2(B)$ nanoflowers. In this system, since ZnO has a similar energy band as $TiO_2(B)$, the energy band level of ZnO will match well with $TiO_2(B)$ and form Type II heterojunction stably.

The technical solution of the present invention is:

A preparation method of a catalyst for a photocatalytic reaction for the production of hydrogen by hydrolysis, comprising: after dispersing ZnO nanorods into a solvent, adding $TiCl_4$ and water, followed by hydrothermal treatment, washing and drying to obtain a ZnO@$TiO_2(B)$ nanoflower catalyst, i.e. the catalyst.

Preferably, the solvent is ethylene glycol;

deionized water and absolute ethanol are used in the washing process for washing.

Preferably, the temperature of the hydrothermal treatment is 140-160° C., and the time is 3.5-4.5 h; the drying temperature is 55-65° C., and the drying time is 20-24 h.

Preferably, the temperature of the hydrothermal treatment is 150° C., and the time is 4 h;

the drying temperature is 60° C., and the drying time is 24 h.

Preferably, the molar ratio of Zn and Ti in the catalyst is 1:1-6.

Preferably, the ZnO nanorods were synthesized by electrodeposition method.

Further preferably, the synthesis process of the ZnO nanorods is: subjecting an aqueous solution containing zinc nitrate and urotropine to electrodeposition treatment in a quartz electrolytic cell at 90° C., followed by centrifugation, washing, and drying to obtain the ZnO nanorods.

Further preferably, the molar concentrations of zinc nitrate and urotropine are 0.04-0.06 mol/L and 0.04-0.06 mol/L respectively;

in the electrodeposition process, a CFs, a platinum plate and a saturated calomel electrode (SCE) are used as a working electrode, a counter electrode and a reference electrode, respectively; the voltage on the working electrode is −1.1 v, and the reaction time is 2 h;

the drying was performed at 60° C. under vacuum.

Further preferably, the molar concentrations of zinc nitrate and urotropine are 0.05 mol/L and 0.05 mol/L respectively;

prior to the electrodeposition process, sonicating the CFs in acetone, deionized water, and ethanol, respectively.

In the following examples, the experimental methods used are conventional unless otherwise specified, and the reagents, materials and the like used may be purchased from chemical reagent companies.

Example 1

The $TiO_2(B)$ synthesis procedure was as follows:

9 ml of ethylene glycol was transferred into an 80 mL Teflon-lined stainless steel autoclave.

Then, 0.3 mL $TiCl_4$ was gradually dropped into the suspension at room temperature until no HCl gas was formed at room temperature. Thereafter, an equal volume of deionized water was added to the mixture. The sealed autoclave was heated in an oven at 150° C. for 4 h.

Finally, the resulting TiO$_2$(B) nanoflower product was collected by centrifugation, washed with deionized water and absolute ethanol, and dried in a vacuum oven at 60° C. for 24 h.

The specific surface area of TiO$_2$(B) nanoflowers was 395.574 m$^2$/g, and the photocatalytic hydrogen production rate was 0.482 mmol/g/h.

Example 2 the molar ratio of Zn:Ti in catalyst was 1:1 and the synthesis procedure was as follows:
(1) Preparation of ZnO Nanorods:

the electrodeposition was performed in a quartz electrolytic cell containing a mixed aqueous solution of 0.05 mol/L Zn(NO$_3$)$_2$ and 0.05 mol/L urotropine, and the quartz electrolytic cell was placed in a water bath environment at 90° C. for electrodeposition.

The white product was then collected by centrifugation, washed several times with deionized water and absolute ethanol, and dried at 60° C. overnight to give ZnO nanorods.

wherein, in electrodeposition preparation method, CFs, platinum plate and saturated calomel electrode (SCE) were used as working electrode, counter electrode and reference electrode, respectively; The voltage on the working electrode was −1.1 v and the reaction time was 2 h.

Prior to preparation of CFs working electrode, CFs shall be respectively placed in acetone, deionized water and ethanol for ultrasonic treatment.
(2) Preparation of Nanoflowers:

in a typical synthesis procedure, after dispersing 222.2 mg ZnO nanorods in 9 ml ethylene glycol for 15 min by sonication, the homogeneous ZnO suspension was transferred to an 80 mL Teflon-lined stainless steel autoclave.

Then, 0.3 mL TiCl$_4$ was gradually dropped into the suspension at room temperature until no HCl gas was formed at room temperature. Thereafter, an equal volume of deionized water was added to the mixture. The sealed autoclave was heated in an oven at 150° C. for 4 h.

Finally, the obtained nanoflower product from Zn:Ti of 1:1 was collected by centrifugation, washed with deionized water and absolute ethanol, and dried in a vacuum oven at 60° C. for 24 h.

As determined, the nano flower having a molar ratio of Zn:Ti of 1:1 has a specific surface area of 344.024 m$^2$/g and a photocatalytic hydrogen generation rate of 0.944 mmol/g/h.

Example 3 the molar ratio of Zn:Ti in catalyst was 1:2 and the synthesis procedure was the same as in Example 2, except that:

0.6 mL TiCl$_4$ was weighed and gradually dripped into 18 ml ethylene glycol suspension.

As determined, the nano flower having a molar ratio of Zn:Ti of 1:2 has a specific surface area of 352.465 m$^2$/g and a photocatalytic hydrogen generation rate of 1.064 mmol/g/h.

Example 4 the molar ratio of Zn:Ti in catalyst was 1:3 and the synthesis procedure was the same as in Example 2, except that:

0.9 mL TiCl$_4$ was weighed and gradually dripped into 27 ml ethylene glycol suspension.

As determined, the nano flower having a molar ratio of Zn:Ti of 1:3 has a specific surface area of 369.583 m$^2$/g and a photocatalytic hydrogen generation rate of 1.315 mmol/g/h.

Example 5 the molar ratio of Zn:Ti in catalyst was 1:4 and the synthesis procedure was the same as in Example 2, except that:

1.2 mL TiCl$_4$ was weighed and gradually dripped into 36 ml ethylene glycol suspension.

As determined, the nano flower having a molar ratio of Zn:Ti of 1:4 has a specific surface area of 379.411 m$^2$/g and a photocatalytic hydrogen generation rate of 1.695 mmol/g/h, after 36 h of cyclic stability test, the sample stability was stable above 90%.

A scanning electron micrograph of the nano flower prepared in the example is shown in FIG. 1. Scanning electron micrographs (FIG. 1) reveal the microstructure of nanoflowers as the molar ratio of Zn:Ti being 1:4 in synthesized material. The dissolution of ZnO embedded the fragmented ZnO nanocrystals into the TiO$_2$(B) lattice to produce ZnO@TiO$_2$(B) nanoflowers.

Figure 5:
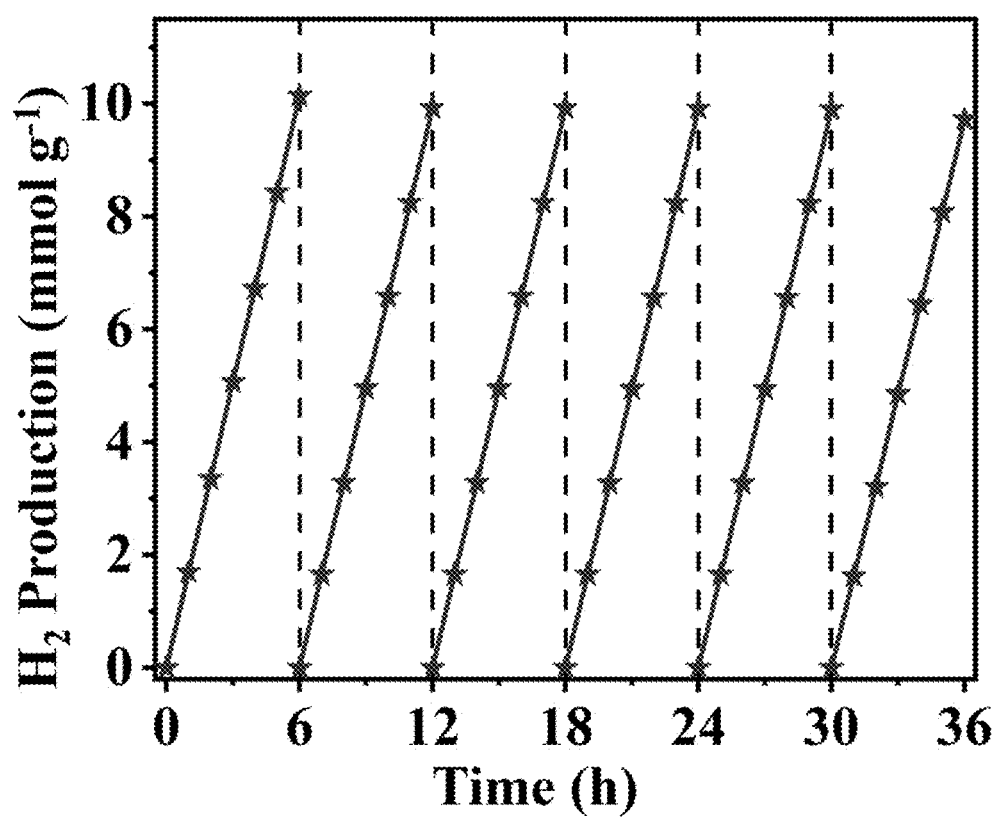
FIG. 5 shows the cycle stability of hydrogen production from photocatalytic decomposition of water of Example 5.

The cycle stability of hydrogen production from the photocatalytic decomposition of water of the nanoflower prepared in this example is shown in FIG. 5. This result further confirms the stability and reusability of nanoflowers with the molar ratio of Zn:Ti of 1:4, and the embedding method of ZnO improves the photoetching phenomenon of ZnO itself, also benefiting from the high stability of the composite.

Example 6 the molar ratio of Zn:Ti in catalyst was 1:5 and the synthesis procedure was the same as in Example 2, except that:

1.5 mL TiCl$_4$ was weighed and gradually dripped into 45 ml ethylene glycol suspension.

As determined, the nano flower having a molar ratio of Zn:Ti of 1:5 has a specific surface area of 380.157 m$^2$/g and a photocatalytic hydrogen generation rate of 0.824 mmol/g/h.

Example 7 the molar ratio of Zn:Ti in catalyst was 1:6 and the synthesis procedure was the same as in Example 2, except that:

1.8 mL TiCl$_4$ was weighed and gradually dripped into 54 ml ethylene glycol suspension.

As determined, the nano flower having a molar ratio of Zn:Ti of 1:6 has a specific surface area of 394.475 m$^2$/g and a photocatalytic hydrogen generation rate of 0.771 mmol/g/h.

Figure 2:
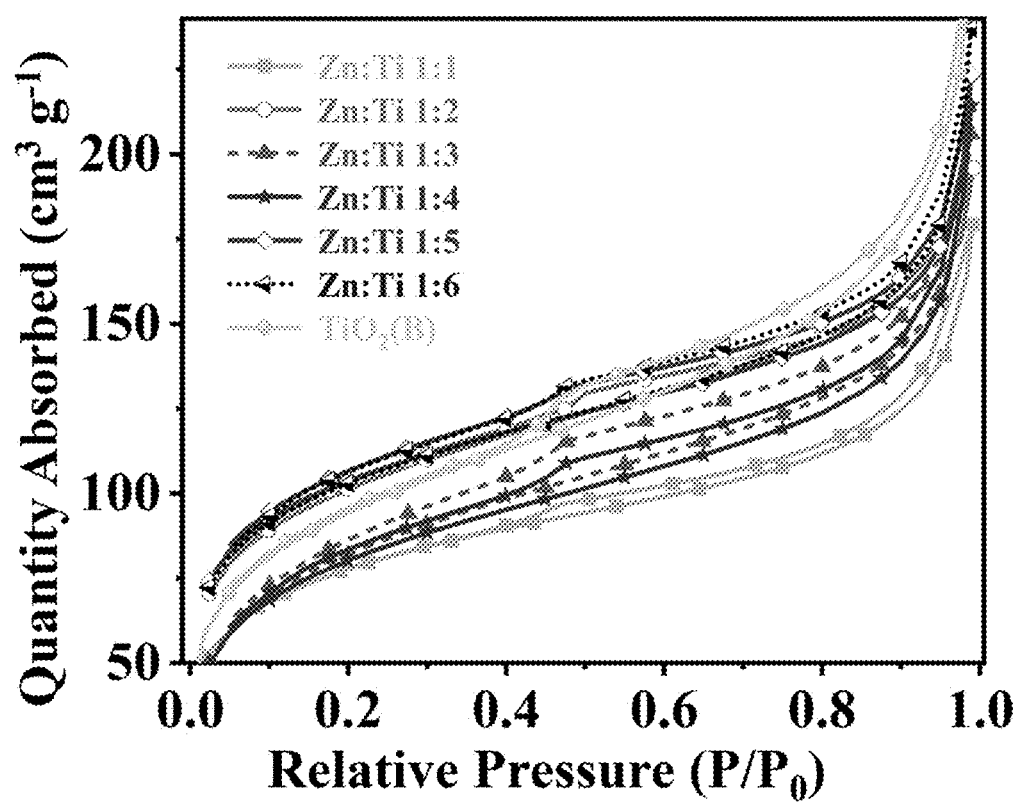
FIG. 2 shows an $N_2$ adsorption-desorption isotherm of the synthesized samples of Examples 1-7.

Experimental Tests:
(1) Mesoporous Structure:

FIG. 2 shows the N$_2$ adsorption-desorption isotherm of the synthesized samples of Examples 1-7. Above the particle surface adsorption studies, we measured the specific surface area of the samples using a QDS-MP-30 specific surface area analyzer. By analyzing the N$_2$ adsorption-desorption isotherms of the synthesized samples, all samples showed a type IV isotherm with a H3 hysteresis loop, which means that there is some mesoporous structure in these samples. After ZnO loading, the specific surface area of ZnO@TiO$_2$ (B) samples tended to decrease, and then the specific surface area of BET decreased from 395.574 m²/g to 344.024 m²/g with the further increase of ZnO loading, which could be attributed to the occupation of nucleation sites on the surface of TiO$_2$(B) nanoplatelets by fragmented ZnO nanocrystals. The composite samples all showed an isotherm similar to that of TiO$_2$(B) nanoflowers, indicating that ZnO embedded in the lattice of TiO$_2$(B) nanoflowers had little effect on the mesoporous structure.

Figure 3:
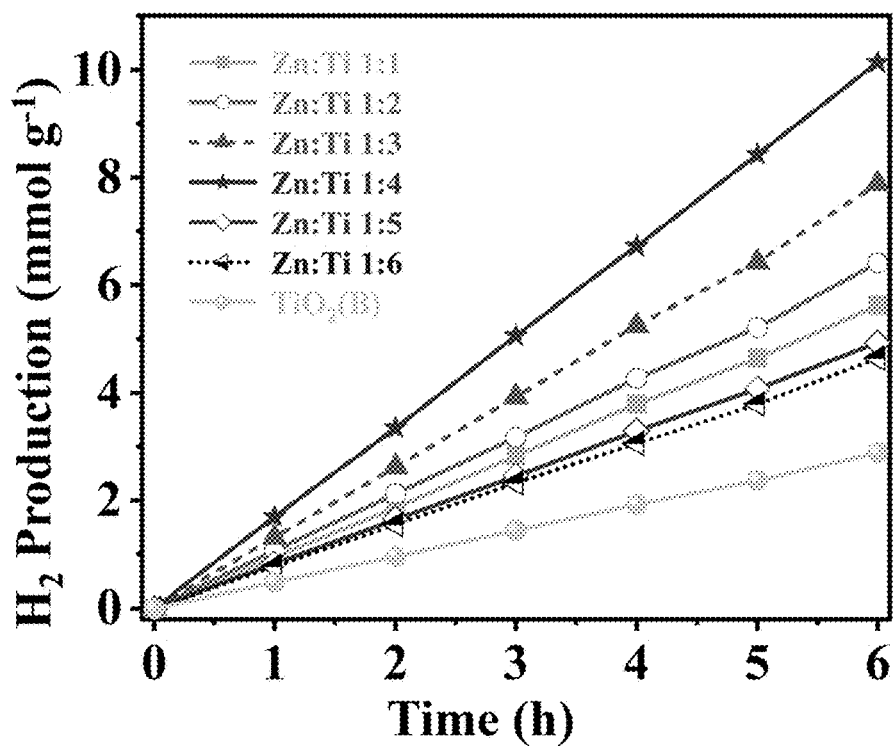
FIG. 3 shows the yield of hydrogen production from photocatalytic decomposition of water from the synthesized samples of Examples 1-7.
Figure 4:
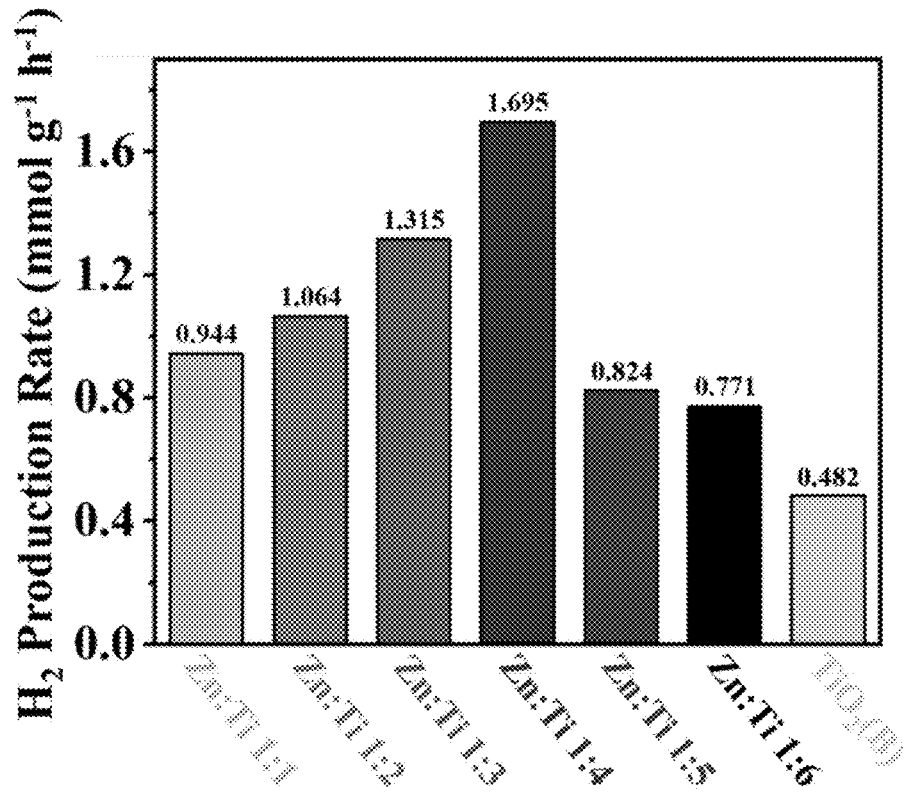
FIG. 4 shows the rate of hydrogen production from photocatalytic decomposition of water from the synthesized samples of Examples 1-7.

(2) Catalyst Performance:

FIG. 3 shows the yield of hydrogen production from photocatalytic decomposition of water from the synthesized samples of Examples 1-7;

FIG. 4 shows the rate of hydrogen production from photocatalytic decomposition of water from the synthesized samples of Examples 1-7.

The test methods are as follows: photocatalytic decomposition of water was performed in a closed glass gas circulation system (LabSolar III AG, Beijing Perfectlight Technology Co., Ltd.). A 300 w xenon lamp (PLS-SEX300C, Beijing Perfectlight Technology Co., Ltd.) was selected as the light source. 50 mg of the catalyst was added into a reactor, 16 mL of deionized water, 4 mL of a mixed solution of 0.1 M Na$_2$S and 0.1 M Na$_2$SO$_3$ was added, ultrasonic dispersion was performed on 30 min, loaded into a catalytic system, vacuum was pulled to −0.1 MPa, and after adsorption for 1 h in a dark reaction, a photocatalytic reaction was started. During the photocatalytic reaction, the temperature of the reaction solution was maintained at 5° C. by the flow of cooling water. Gas components were analyzed using a 5 molecular sieve column (gas chromatograph (GC-7900, Fuli)). The gas chromatograph was equipped with a thermal conductivity detector (TCD) and high purity argon (99.999%) as carrier gas. Hydrogen production was calculated from retention time and peak area calibrated with standard H$_2$ gas.

As shown in FIGS. 3 and 4, pure TiO$_2$(B) showed very weak hydrogen evolution under simulated sunlight irradiation (0.482 mmol/g/h), indicating that it is inert as a photocatalyst. With the increase of ZnO content, the properties of the composites were improved significantly, and then decreased gradually until the molar ratio of Zn to Ti was 1:4. Nanoflows with a molar ratio of Zn to Ti of 1:4 showed the best photocatalytic hydrogen production performance of 1.695 mmol/g/h, which was 3.5 times higher than that of TiO$_2$(B). This is due to the formation of a heterojunction between ZnO and TiO$_2$(B), charge carrier transfer and separation in the ZnO@TiO$_2$(B) composite being faster than in TiO$_2$(B). The significant improvement in photocatalytic performance can be attributed to the formation of heterojunction contacts between the embedded ZnO and TiO$_2$(B) nanoplatelets, which can enhance charge transport and inhibit the recombination process.

It can be seen from the examples of the present invention that the high photocatalytic performance of ZnO@TiO$_2$(B) nanoflowers can be attributed to the hierarchical structure on the nanometer scale, the large specific surface area. In addition, the heterogeneous interface in the ZnO@TiO$_2$(B) nanoflower phase exhibits the energy band structure of type II heterojunction, further enhancing the photocatalytic performance. Overall, the lattice-embedded ZnO@TiO$_2$(B) nanoflowers solve the problem of poor stability caused by the easy collapse of the TiO$_2$(B) composite structure. At the same time, the uniform distribution of heterogeneous interface in ZnO@TiO$_2$(B) nanoflowers makes full use of heterogeneous interface and improves the efficiency of electron-hole separation. This study provides a new design idea for heterojunction composite photocatalyst.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A preparation method of a catalyst for a photocatalytic reaction for the production of hydrogen by hydrolysis, wherein, the preparation method comprises: after dispersing ZnO nanorods into a solvent, adding TiCl$_4$ and water, followed by hydrothermal treatment, washing and drying to obtain a ZnO@TiO$_2$(B) nanoflower catalyst, i.e. the catalyst.

2. The preparation method of claim 1, wherein
the solvent is ethylene glycol;
deionized water and absolute ethanol are used in the washing process for washing.

3. The preparation method of claim 1, wherein
the temperature of the hydrothermal treatment is 140-160° C., and the time is 3.5-4.5 h;
the drying temperature is 55-65° C., and the drying time is 20-24 h.

4. The preparation method of claim 1, wherein
the temperature of the hydrothermal treatment is 150° C., and the time is 4 h;
the drying temperature is 60° C., and the drying time is 24 h.

5. The preparation method of claim 1, wherein
the molar ratio of Zn and Ti in the catalyst is 1:1-6.

6. The preparation method of claim 1, wherein
the ZnO nanorods are synthesized by electrodeposition method.

7. The preparation method of claim 6, wherein
the synthesis process of the ZnO nanorods is: subjecting an aqueous solution containing zinc nitrate and urotropine to electrodeposition treatment in a quartz electrolytic cell at 90° C.,
followed by centrifugation, washing, and drying to obtain the ZnO nanorods.

8. The preparation method of claim 7, wherein
the molar concentrations of zinc nitrate and urotropine are 0.04-0.06 mol/L and 0.04-0.06 mol/L respectively;
in the electrodeposition process, a CFs, a platinum plate and a saturated calomel electrode (SCE) are used as a working electrode, a counter electrode and a reference electrode, respectively; the
voltage on the working electrode is −1.1 v, and the reaction time is 2 h;
the drying is performed at 60° C. under vacuum.

9. The preparation method of claim 8, wherein
the molar concentrations of zinc nitrate and urotropine are 0.05 mol/L and 0.05 mol/L respectively;
prior to the electrodeposition process, sonicating the CFs in acetone, deionized water, and ethanol, respectively.

* * * * *